US012674395B2

(12) United States Patent
Roussille et al.

(10) Patent No.: US 12,674,395 B2
(45) Date of Patent: Jul. 7, 2026

(54) ONE-PIECE BLADE PREFORM INCORPORATING OVERLAPPING UNIDIRECTIONAL FABRIC PORTIONS

(71) Applicant: SAFRAN CERAMICS, Le Haillan (FR)

(72) Inventors: Clément Marie Benoît Roussille, Moissy-Cramayel (FR); Marie Lefebvre, Moissy-Cramayel (FR); Julien André Roger Mateo, Moissy-Cramayel (FR); Jérémy Paul André Blachier, Moissy-Cramayel (FR); Aline Planckeel, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 19/136,708

(22) PCT Filed: Dec. 4, 2023

(86) PCT No.: PCT/FR2023/051920
§ 371 (c)(1),
(2) Date: Jun. 6, 2025

(87) PCT Pub. No.: WO2024/121498
PCT Pub. Date: Jun. 13, 2024

(65) Prior Publication Data
US 2026/0009332 A1    Jan. 8, 2026

(30) Foreign Application Priority Data
Dec. 9, 2022    (FR) ...................................... 2213052

(51) Int. Cl.
F01D 5/14    (2006.01)
B29B 11/16    (2006.01)
F01D 5/28    (2006.01)

(52) U.S. Cl.
CPC .............. *F01D 5/147* (2013.01); *B29B 11/16* (2013.01); *F01D 5/282* (2013.01); *F05D 2300/603* (2013.01)

(58) Field of Classification Search
CPC ......... B29B 11/00; B29B 11/14; B29B 11/16; F01D 5/147; F01D 5/28; F01D 5/282; F05D 2300/601–6034
See application file for complete search history.

(56) References Cited

U.S. PATENT DOCUMENTS 9,080,454 B2    7/2015    Coupe et al.
9,752,445 B2*    9/2017    Watanabe ............... F01D 5/282
(Continued)

FOREIGN PATENT DOCUMENTS

WO    WO 2013/034857 A2    3/2013
WO    WO 2022/129733 A1    6/2022

OTHER PUBLICATIONS

Written Opinion of the International Searching Authority as issued in International Patent Application No. PCT/FR2023/051920, dated Mar. 15, 2024.

(Continued)

*Primary Examiner* — Christopher R Legendre
(74) *Attorney, Agent, or Firm* — CUSHMAN PARTNERS, LLC

(57)    ABSTRACT
A blade fiber preform for a turbomachine has a three-dimensional or multi-layer weave including in one piece a root preform part, a shank preform part, first and second platform preform parts, upstream and downstream wall preform parts, upstream and downstream spoiler preform (Continued)

parts, and an airfoil part. The preform further includes unidirectional fabric portions folded down onto the shank preform part and third and fourth unidirectional fabric portions folded down onto the airfoil part.

13 Claims, 12 Drawing Sheets

(56) References Cited

U.S. PATENT DOCUMENTS

| | | | | |
|---|---|---|---|---|
| 10,532,521 | B2 * | 1/2020 | Lanfant | ............. C04B 35/62873 |
| 11,958,784 | B2 * | 4/2024 | Delehouze | .............. F01D 5/284 |
| 2017/0198591 | A1 | 7/2017 | Roussille et al. | |
| 2026/0009332 | A1 * | 1/2026 | Roussille | ................ D03D 1/00 |

OTHER PUBLICATIONS

International Search Report as issued in International Patent Application No. PCT/FR2023/051920, dated Mar. 15, 2024.

* cited by examiner

[Fig. 1]
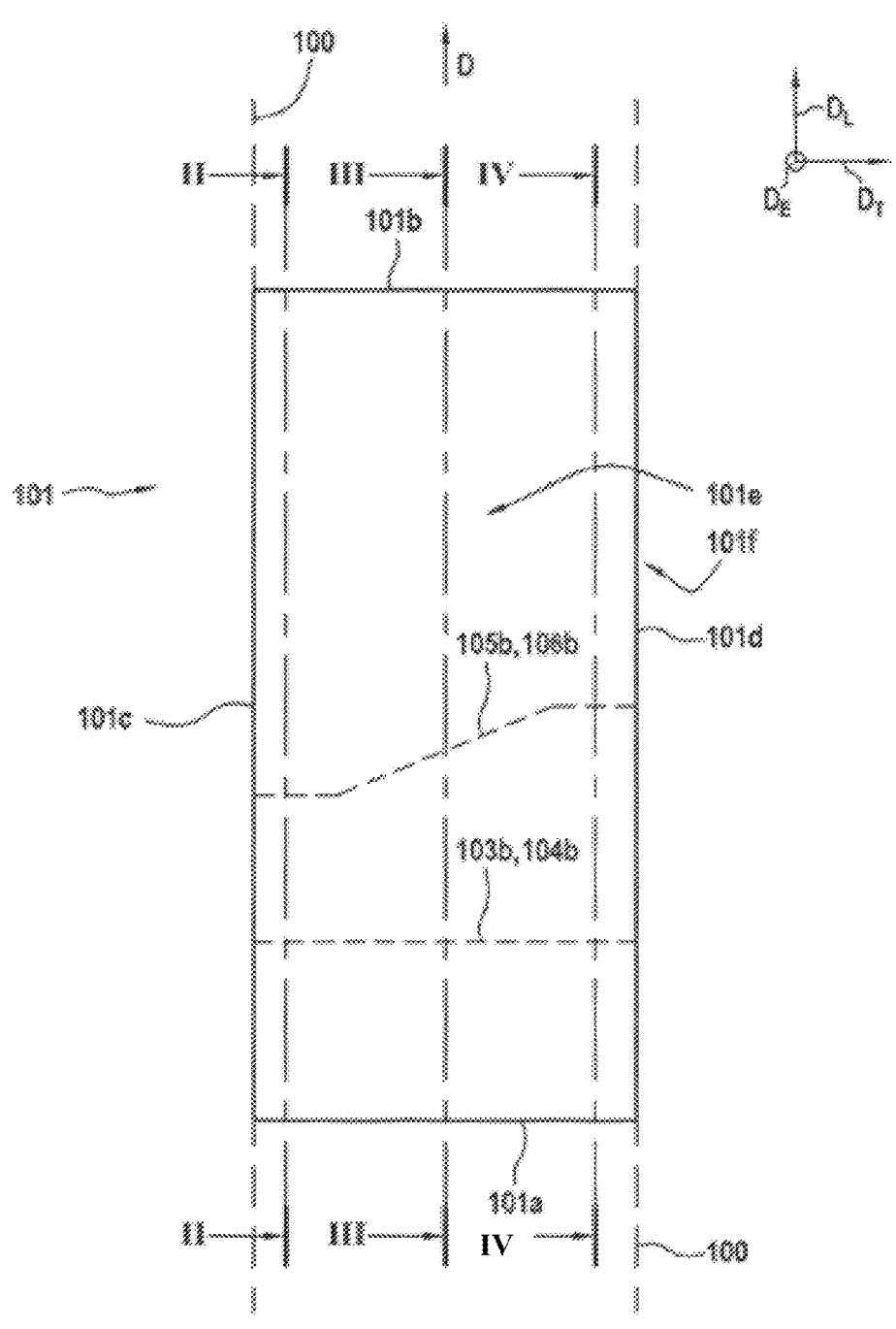

[Fig. 2]
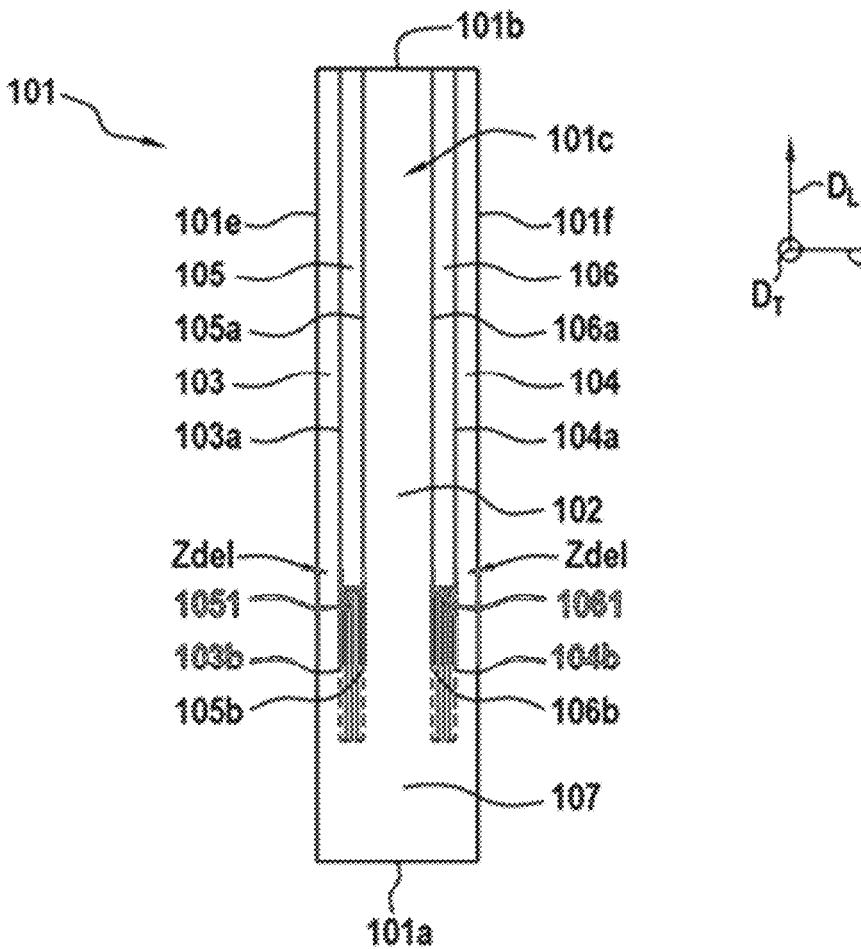

[Fig. 3]
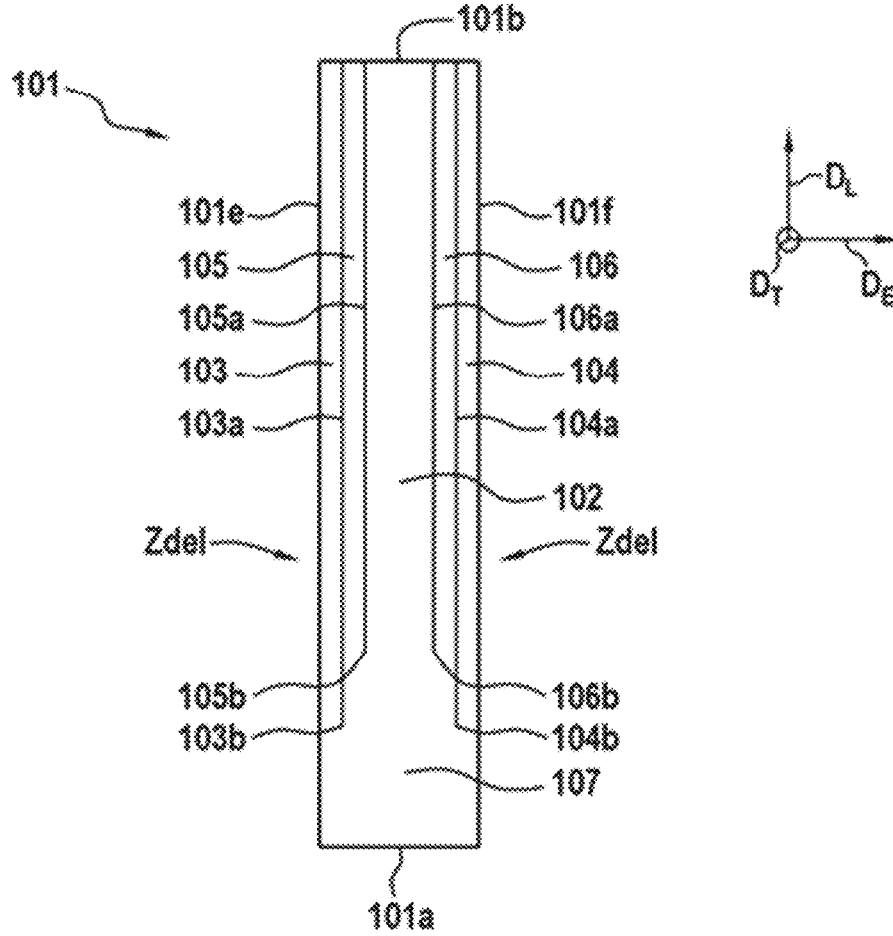

[Fig. 4]
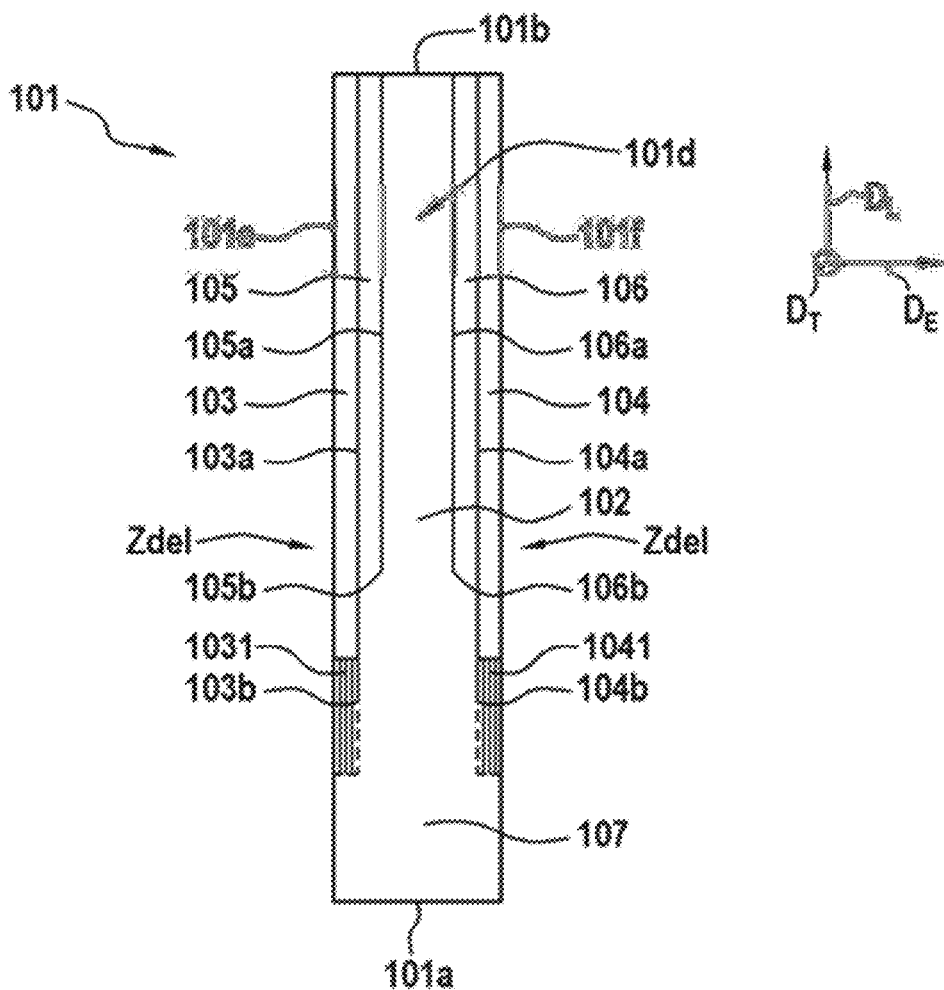

[Fig. 5]
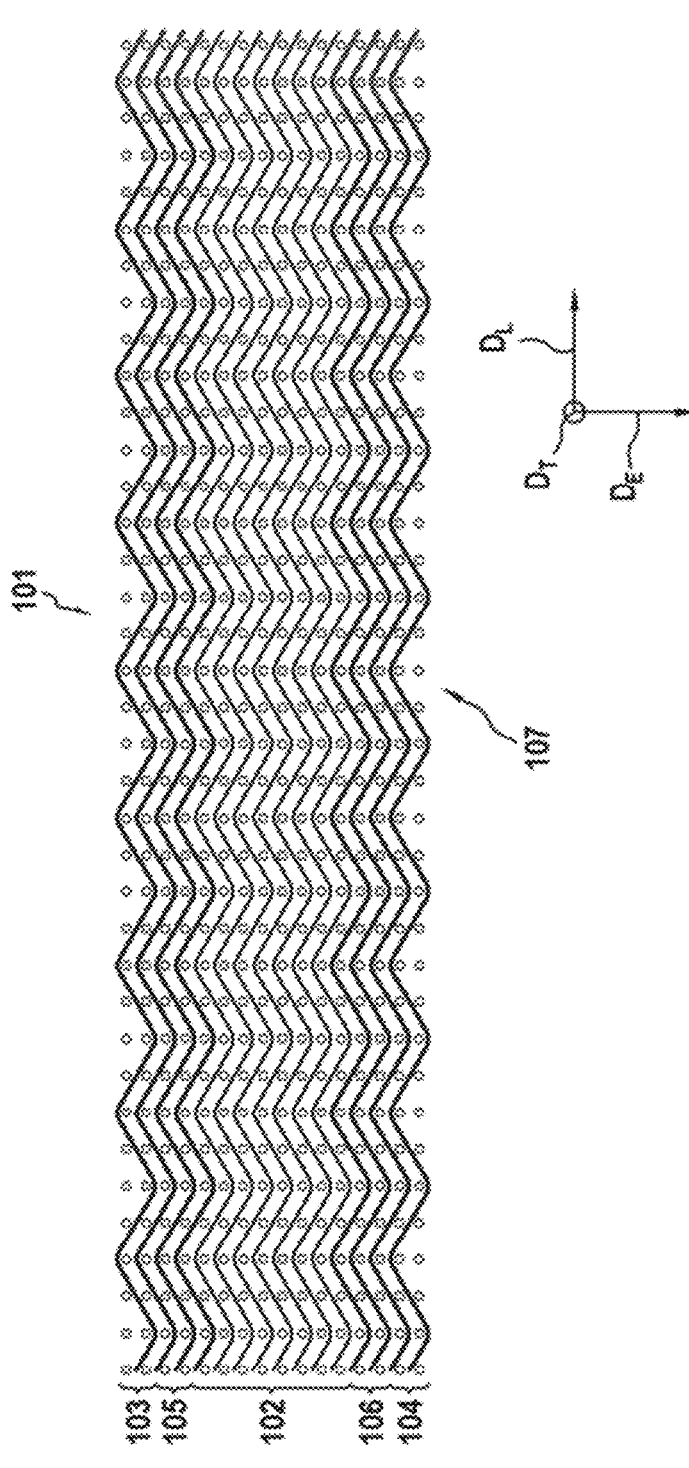

[Fig. 6]
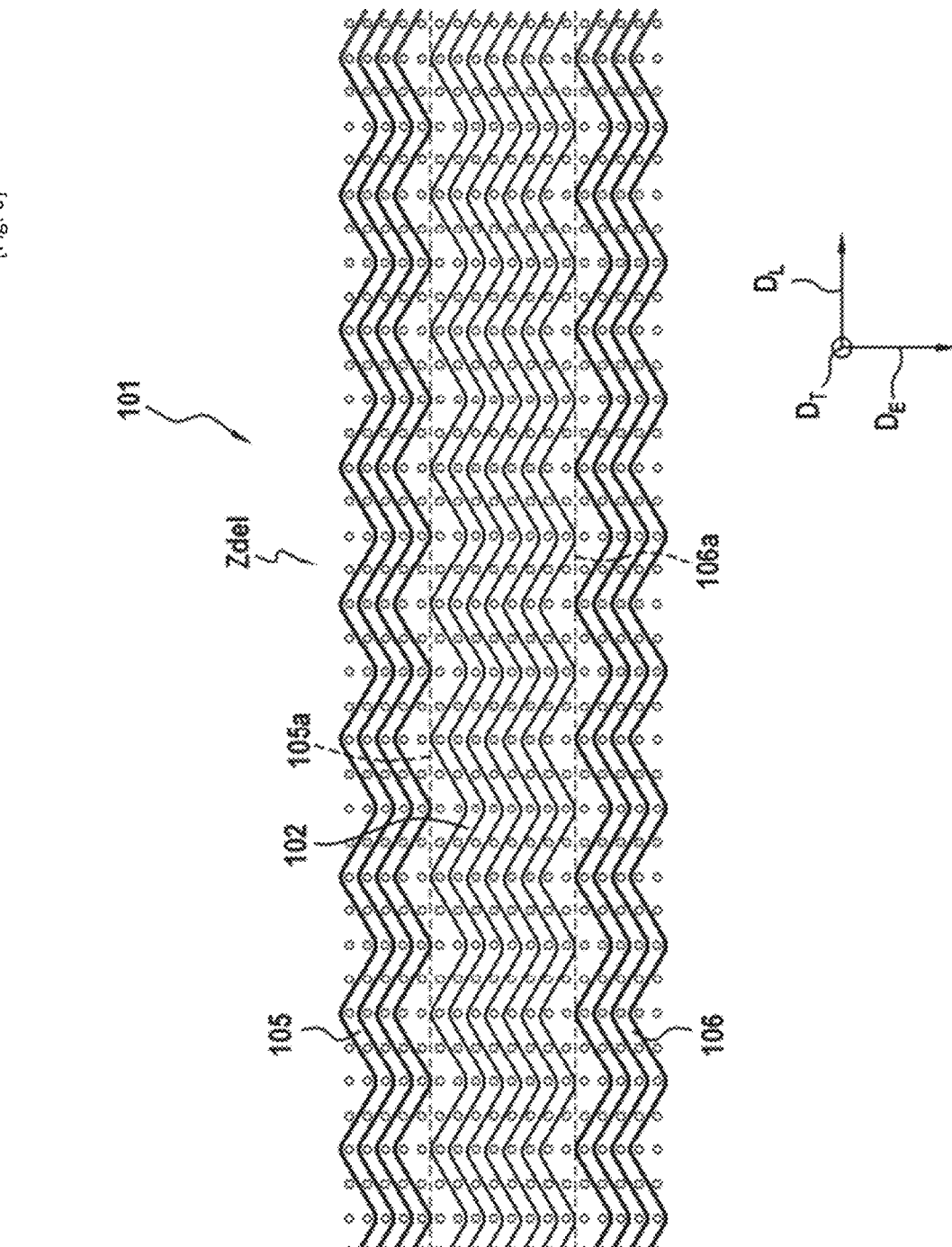

[Fig. 7]
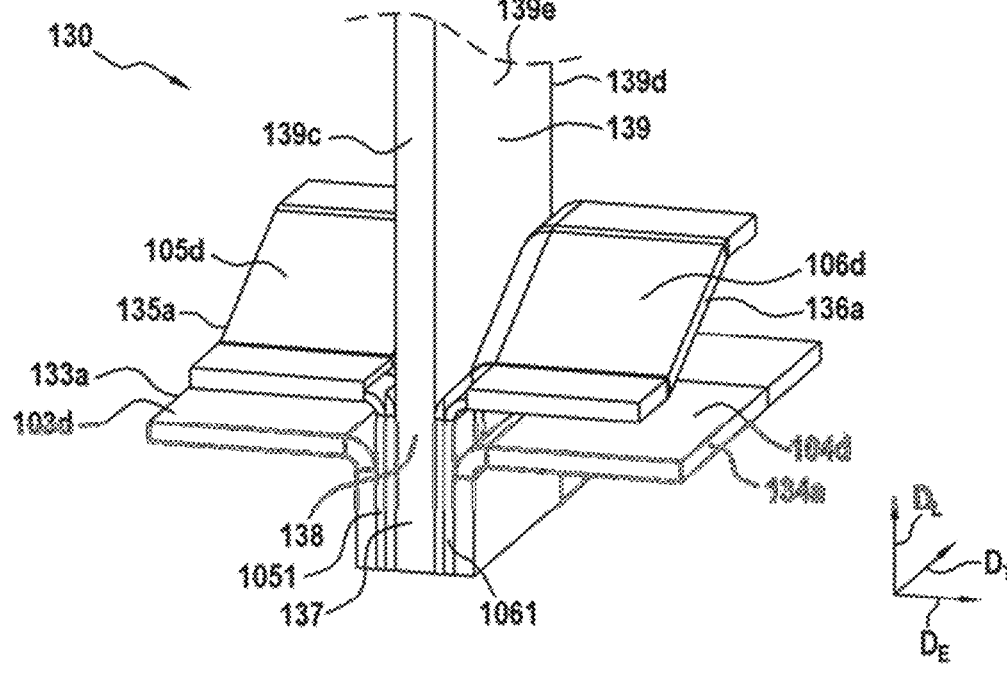

[Fig. 8]
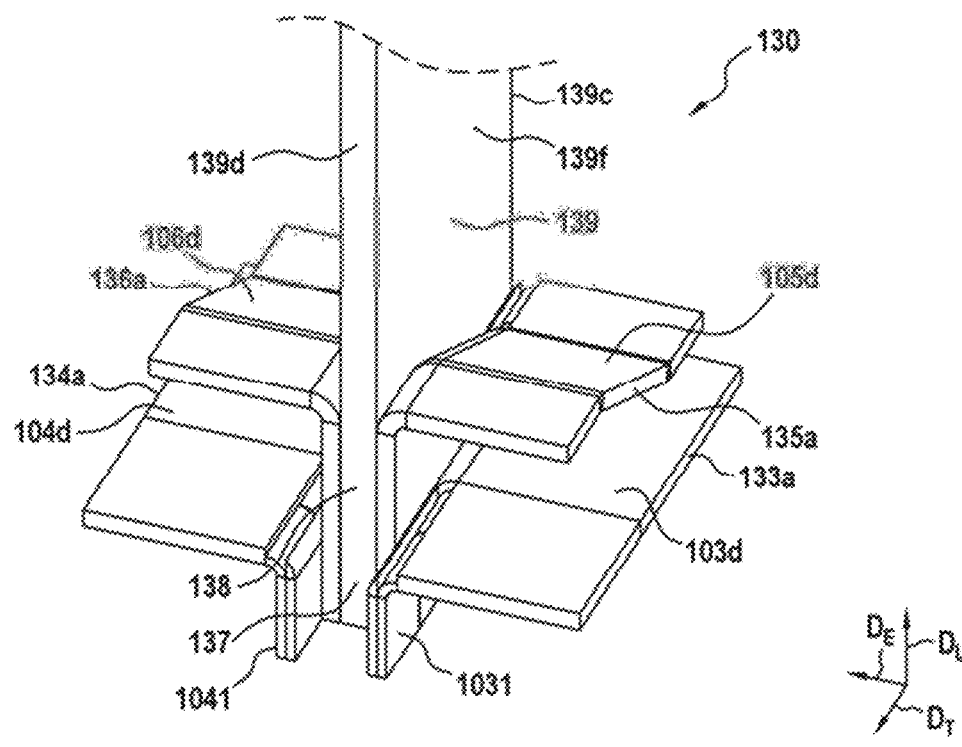

[Fig. 9]
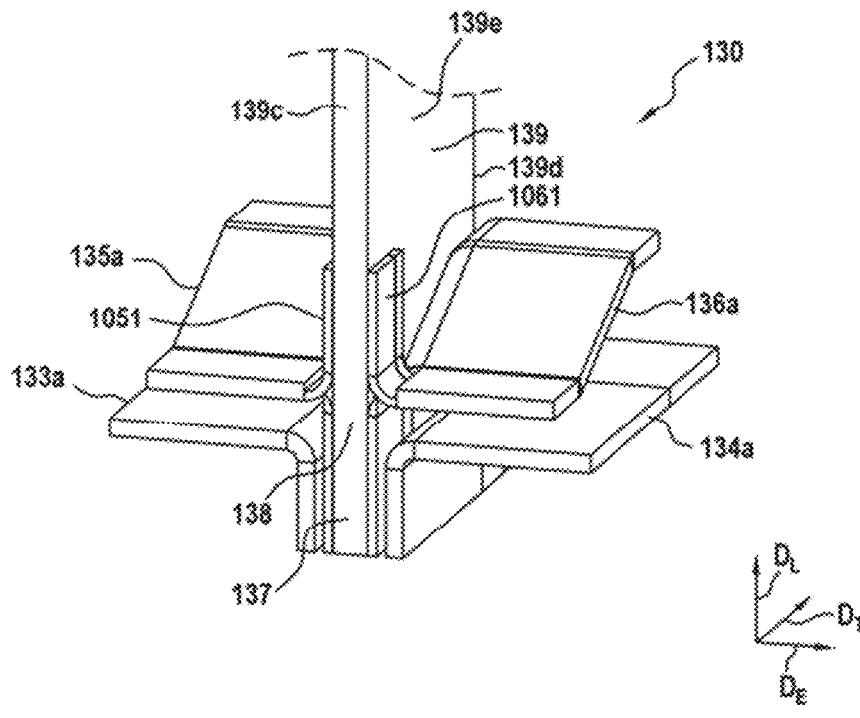

[Fig. 10A]
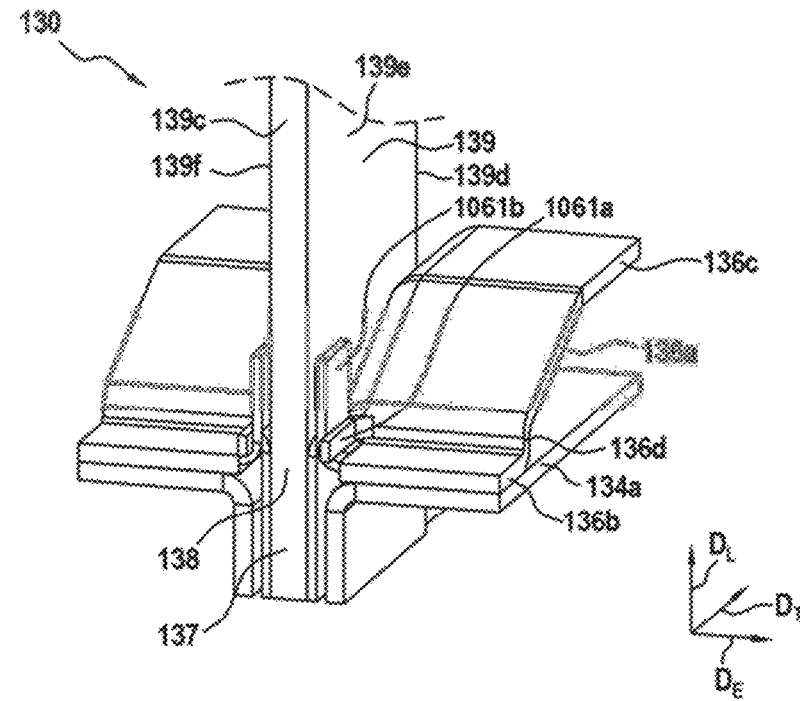
[Fig. 10B]
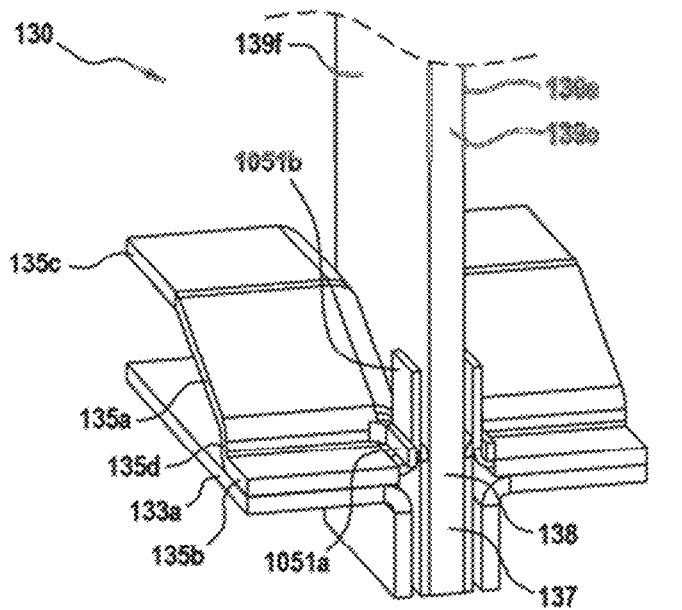

[Fig. 11A]
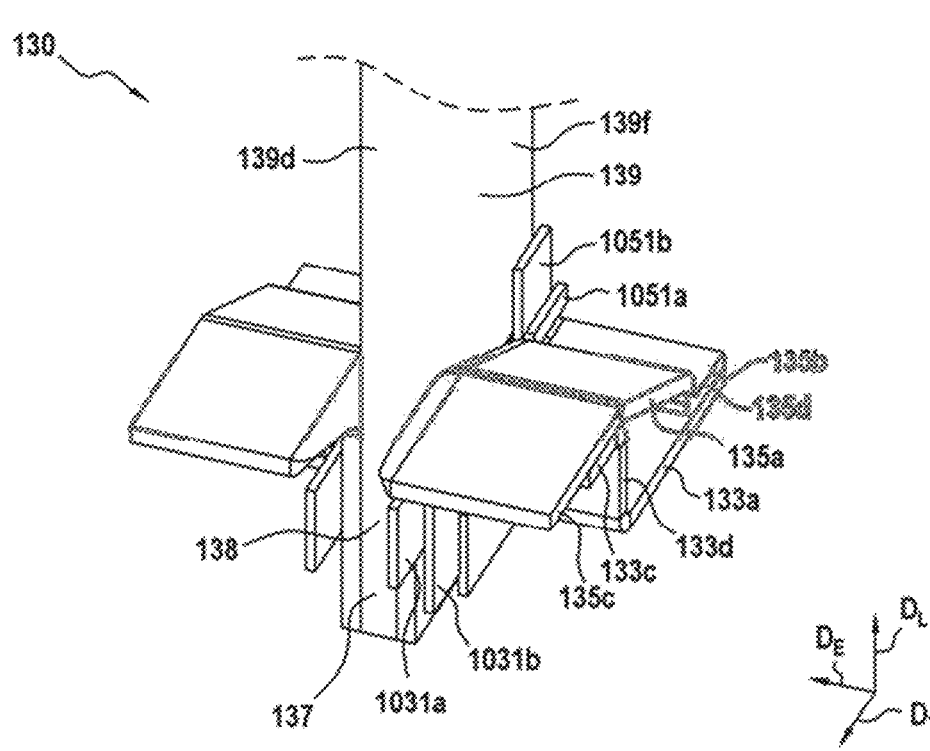
[Fig. 11B]
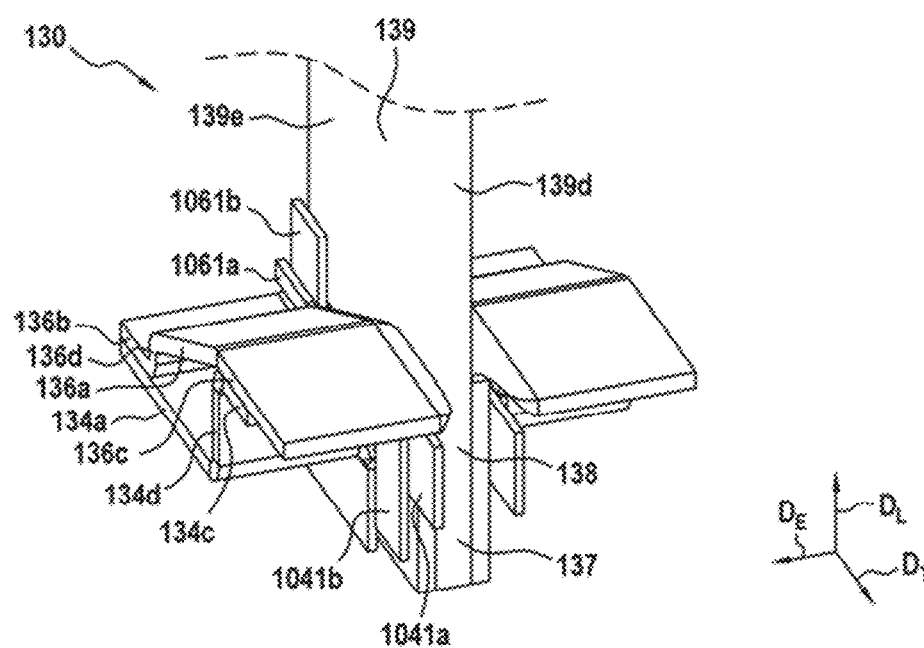

[Fig. 12]
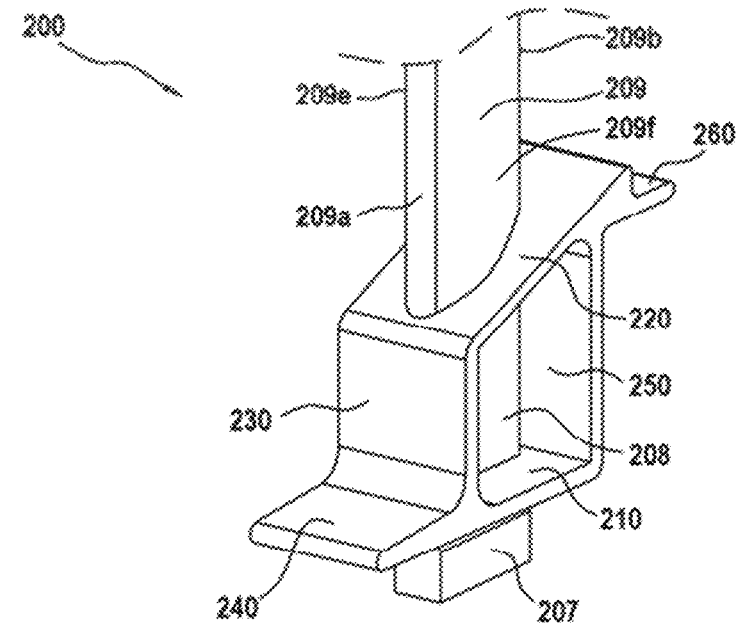

1

ONE-PIECE BLADE PREFORM INCORPORATING OVERLAPPING UNIDIRECTIONAL FABRIC PORTIONS

CROSS-REFERENCE TO RELATED APPLICATIONS

This application is the U.S. National Stage of PCT/ FR2023/051920, filed Dec. 4, 2023, which in turn claims priority to French patent application number 22 13052 filed Dec. 9, 2022. The content of these applications are incorporated herein by reference in their entireties.

TECHNICAL FIELD

The present invention relates to the field of blades made of composite material comprising a fibrous reinforcement densified by a matrix. The targeted field is that of gas turbine blades for aeronautical engines or industrial turbines.

PRIOR ART

The production of blades made of composite material for turbomachines has already been proposed.

Organic matrix composites (OMC) and ceramic matrix composites (CMC) replace metal parts in certain parts of turbomachines. Their use contributes to optimizing aircraft performance, especially by improving turbomachine efficiency and reducing the overall weight of the turbomachine, significantly reducing emissions harmful to the environment ($CO$, $CO_2$, $NOx$, etc.).

Document U.S. Pat. No. 9,080,454 describes the manufacture of a turbomachine blade made of composite material comprising a fibrous reinforcement densified by a matrix. More precisely, this method has the particular feature that the fiber blank produced by three-dimensional weaving is shaped to obtain a fiber preform in one piece having a first part forming a blade airfoil and root preform and at least one second part forming a blade platform preform. Thus, after densification of the preform, it is possible to obtain a blade made of composite material having a fibrous reinforcement composed of the preform and densified by the matrix, and forming one piece with a platform provided with overlapping spoilers. The production of the fibrous reinforcement by three-dimensional weaving in one piece has several advantages, such as, especially, that of conferring on the blade very good mechanical properties, in particular very good resistance to delamination, and that of allowing the production of parts with complex geometries.

Documents WO 2022/129733, WO 2013/034857 and US 2017/198591 also disclose fiber preforms for turbomachine blades made of composite material.

On a gas turbine blade, secondary sealing and aerodynamic functions are to be provided. In the lower part of the blade, i.e., in the vicinity of the blade root, these functions are provided by platforms connected together by walls and overlapping spoilers. In the case of a blade made of composite material with fibrous reinforcement made by three-dimensional weaving in one piece, the deployment of the platforms, walls and spoilers during the shaping of the fiber blank (production of the blade preform) can prove difficult because of the limits of the deployability of three-dimensional woven textures and the problem of the triple point at the intersection of the walls, spoilers and blade root.

2

DISCLOSURE OF THE INVENTION

It is therefore desirable to be able to propose a solution for the production of blades of composite material from a three-dimensional weave which does not have the aforementioned disadvantages.

To this end, the invention proposes a method of manufacturing a fiber preform of a turbomachine blade made of composite material, the method comprising:

the formation by three-dimensional or multi-layer weaving between a plurality of layers of warp yarns and a plurality of layers of weft yarns of a fiber blank extending, along a longitudinal direction corresponding to the longitudinal direction of the blade to be produced, between first and second longitudinal ends, the fiber blank extending, along a transverse direction corresponding to the transverse direction of the blade to be produced, between first and second transverse ends intended to form, respectively, a leading edge and trailing edge of the blade, the fiber blank extending, along a thickness direction of the blank, between the first and second faces intended to form, respectively, a pressure face and a suction face of the blade, the fiber blank being separated along the thickness direction into first to fifth parts in first to fourth non-interlinking sections each extending along the longitudinal direction from a bottom of a non-interlinking section present at a determined distance from the first longitudinal end of the fiber blank, the first part being located between the second and fourth parts, on one side, and the third and fifth parts, on the other side, the first part being bound by weaving to the second to fifth parts in an area extending between the first longitudinal end of the blank and the bottoms of the non-interlinking sections, the fourth and fifth parts comprising on the side of the first transverse end of the blank a portion in which the warp yarns are not woven with the weft yarns so as to define first and second unidirectional fabric portions, each unidirectional fabric portion extending over a predetermined distance along the longitudinal direction at least from the bottom of the third and fourth non-interlinking sections and a predetermined distance along the transverse direction from the first transverse end, the second and third parts comprising on the side of the second transverse end a portion in which the warp yarns are not woven with the weft yarns so as to define third and fourth unidirectional fabric portions, each unidirectional fabric portion extending over a predetermined distance along the longitudinal direction at least from the bottom of the first and second non-interlinking sections and a predetermined distance along the transverse direction from the second transverse end, the formation, from the fiber blank, of a preform of the blade to be produced, by unfolding on either side of the first part of the blank segments of the second to fifth parts not bound to the first part and by shaping the unfolded segments of the second to fifth parts to form parts of preforms of platforms, walls and spoilers, the shaping of the segments of the second to fifth parts comprising folding down the first to fourth parts of unidirectional fabric onto the first part.

The shaping of the walls and spoilers is greatly facilitated by the presence of unidirectional fabric portions at the triple points of the fiber blank. Indeed, the stresses and tensions induced in the blank at the connections of the second to fifth parts with the first part can be considerably reduced by means of the relaxation provided by the unidirectional fabric portions. It is thus possible to obtain blade preforms with complex geometry from a fiber blank woven in one piece.

According to one characteristic of the method of the invention, the shaping of the unfolded segments of the fourth and fifth parts comprises the formation of preform parts of a first platform, preform parts of an upstream wall, and preform parts of an upstream spoiler, and in which the shaping of the unfolded segments of the second and third parts comprises the formation of preform parts of a second platform, preform parts of a downstream wall, and preform parts of a downstream spoiler.

According to another characteristic of the method of the invention, forming the preform parts of an upstream wall and the preform parts of an upstream spoiler comprises folding down, along the transverse direction, a first part of the first and second unidirectional fabric portions onto a second part of said first and second unidirectional fabric portions extending along the longitudinal direction.

According to another characteristic of the method of the invention, forming the preform parts of a downstream wall and the preform parts of a downstream spoiler comprises folding down, along the transverse direction, a first part of the third and fourth unidirectional fabric portions onto the first part.

The invention also relates to a method for manufacturing a turbomachine vane or blade made of composite material, the method comprising:

- manufacture of a turbomachine blade preform according to the method for manufacturing a blade fiber preform,
- densification of the preform by a matrix to obtain a blade made of composite material having first and second integrated platforms, an integrated upstream and downstream wall and an integrated upstream and downstream spoiler.

The invention also relates to a blade fiber preform for a turbomachine having a three-dimensional or multilayer weave comprising in one piece first and second platform preform parts, upstream and downstream wall preform parts, upstream and downstream spoiler preform parts, and an airfoil preform part, the preform further comprising first and second unidirectional fabric portions folded down onto the shank preform part, and third and fourth unidirectional fabric portions folded down onto the airfoil part.

According to one characteristic of the preform of the invention, a first part of the first and second unidirectional fabric portions is folded down along the transverse direction onto the airfoil preform part at the upstream wall preform parts and the upstream spoiler preform parts.

According to one characteristic of the preform of the invention, a first part of the third and fourth unidirectional fabric portions is folded down along the transverse direction onto a second part of said first and second unidirectional fabric portions extending along the longitudinal direction at the downstream wall preform parts and downstream spoiler preform parts.

According to another characteristic of the preform of the invention, it further comprises a root preform part and a shank preform part.

The invention also concerns a turbomachine blade made of composite material comprising a fibrous reinforcement densified by a matrix, the blade comprising first and second platforms, upstream and downstream walls, upstream and downstream spoilers and an airfoil, the fibrous reinforcement comprising a blade fiber preform according to the invention.

The invention also concerns a turbomachine blade made of composite material comprising a fibrous reinforcement densified by a matrix, the blade comprising a root, a shank, first and second platforms, upstream and downstream walls, upstream and downstream spoilers and an airfoil, the fibrous reinforcement comprising a blade fiber preform according to the invention.

The invention also concerns an aeronautical engine comprising a plurality of blades according to the invention.

The invention also concerns an aircraft comprising an engine according to the invention.

BRIEF DESCRIPTION OF THE DRAWINGS

FIG. 1 is a schematic plan view of a woven fiber blank for making a blade fiber preform according to one embodiment of the invention, FIG. 2 is a side sectional view of the blank of FIG. 1 along plane II-II of FIG. 1, FIG. 3 is a side sectional view of the blank of FIG. 1 along plane III-III of FIG. 1, FIG. 4 is a side sectional view of the blank of FIG. 1 along plane IV-IV of FIG. 1, FIG. 5 is an enlarged schematic view of plans for weaving the blank of FIG. 1, FIG. 6 is an enlarged schematic view of plans for weaving the blank of FIG. 1, FIG. 7 is a schematic perspective view showing one step of producing a blade preform from the fiber blank of FIGS. 1 to 4, FIG. 8 is a schematic perspective view showing another step of producing a blade preform from the fiber blank of FIGS. 1 to 4, FIG. 9 is a schematic perspective view showing another step of producing a blade preform from the fiber blank of FIGS. 1 to 4, FIG. 10A is a schematic perspective view showing another step of producing a blade preform from the fiber blank of FIGS. 1 to 4, FIG. 10B is a schematic perspective view showing another step of producing a blade preform from the fiber blank of FIGS. 1 to 4, FIG. 11A is a schematic perspective view showing another step of producing a blade preform from the fiber blank of FIGS. 1 to 4, FIG. 11B is a schematic perspective view showing another step of producing a blade preform from the fiber blank of FIGS. 1 to 4, FIG. 12 is a schematic perspective view showing a blade obtained from the blade preform of FIGS. 11A and 11B.

DESCRIPTION OF THE EMBODIMENTS

The invention is applicable to various types of turbomachine blades with integrated platforms. It is especially applicable to fixed compressor vanes, i.e., not having a root and shank. It is also applicable to compressor and turbine blades of different gas turbine bodies.

FIG. 1 shows in plan view a fiber blank 101 from which a blade fiber preform can be formed in accordance with one embodiment of the invention.

The blank 101 is obtained from a strip 100 woven by three-dimensional weaving (3D), the strip 100 extending generally in a direction D. "Three-dimensional weaving" or "3D weaving" is understood here to mean a weaving method by which at least some of the weft yarns bind warp yarns on several warp layers, or vice versa. An example of three-dimensional weaving is the so-called interlock pattern. Weaving is carried out, for example, with warp yarns extending in the direction D, it being noted that weaving with weft yarns extending in this direction is also possible. A plurality of blanks 101 can be woven sequentially in the direction D. It is also possible to simultaneously weave several parallel rows of blanks 101.

In the embodiment of FIGS. 1 to 4, a fiber blank 101 extends, along a longitudinal direction $D_L$ corresponding to the longitudinal direction of the blade to be produced, between first and second longitudinal ends 101a, 101b and along a transverse direction $D_T$ corresponding to the transverse direction of the blade to be produced, between first and second transverse ends 101c, 101d intended to form a leading edge and a trailing edge, respectively, of the blade. The fiber blank also extends, along a thickness direction DE of the blank, between first and second faces 101e, 101f, intended to form, respectively, a pressure face and a suction face of the blade.

The fiber blank 101 comprises in its thickness (thickness direction $D_E$) first to fifth parts 102, 103, 104, 105, 106 extending along the longitudinal direction $D_L$. The first part 102 is non-interlinking with the second to fifth parts 103 and 106 at a non-interlinked area $Z_{del}$ comprising first to fourth non-interlinking sections 103a, 104a, 105a, 106a (FIGS. 2 to 4). The non-interlinking sections 103a, 104a, 105a, 106a extend over the entire width of the blank 101 along the transverse direction $D_T$. The non-interlinking sections 103a, 104a, 105a, 106a each extend along the longitudinal direction $D_L$ from a non-interlinking bottom 103b, 104b, 105b, 106b present at a determined distance from the first longitudinal end 101a of the fiber blank 101. The first part 102 is situated in the thickness direction $D_E$ between the second and fourth parts 103, 105, on one side, and the third and fifth parts 104, 106, on the other side. The first part 102 is bound to the second to fifth parts 103 to 106 by 3D weaving in an area 107 extending between the first longitudinal end 101a of the blank and the bottoms 103b, 104b, 105b, 106b of the non-interlinking sections 103a, 104a, 105a, 106a. The area 107 is intended to form a blade root. In the example described here, the non-interlinking bottoms 103b and 104b extend between the first and second transverse ends 101c, 101d along a rectilinear direction parallel to the transverse direction $D_T$ (FIG. 1) so as to form a flat lower platform while the non-interlinking bottoms 105b and 106b have a slope between the first and second transverse ends 101c, 101d (FIG. 1) so as to form an inclined upper platform as explained below.

In a well-known manner, a non-interlinking section is provided between two layers of warp yarns by omitting to pass a weft yarn through the non-interlinking area in order to bind yarns of warp layers situated on either side of the non-interlinking section.

The plans of FIGS. 5 and 6 show an example of 3D weaving with interlock pattern and non-interlinking sections 105a and 106a, the non-interlinking sections 103a and 104a being obtained in the same way as the non-interlinking sections 105a and 106a. In FIG. 6, the non-interlinking sections are represented by dashes. The part 102 comprises a plurality of layers of warp yarns (8 in the example shown) which are bound by 3D weaving. The parts 105 and 106 each comprise a plurality of layers of warp yarns (4 in the example illustrated in FIG. 6) which are bound together by 3D weaving.

In the area 107 situated between the first longitudinal end 101a and the non-interlinking sections 103a, 104a, 105a and 106a delimited by the non-interlinking bottoms 103b, 104b, 105b and 106b, the warp yarn layers of the parts 102 to 106 are all bound together (FIG. 5).

According to the invention, the fourth and fifth parts 105, 106 comprise, on the side of the first transverse end 101c of the blank, a portion in which the warp yarns are not woven with the weft yarns so as to define first and second unidirectional fabric portions 1051 and 1061 (FIG. 2). Each unidirectional fabric portion 1051, 1061 extends over a determined distance along the longitudinal direction $D_L$ at least from the non-interlinking bottom 105b, 106b of the third and fourth non-interlinking sections 105a, 106a and over a determined distance along the transverse direction $D_T$ from the first transverse end 101c. In the example described here, the unidirectional fabric portions 1051 and 1061 extend on either side of the non-interlinking bottoms 105b, 106b (FIG. 2).

Likewise the second and third parts 103, 104 comprise, on the side of the second transverse end 101d a portion in which the warp yarns are not woven with the weft yarns so as to define third and fourth unidirectional fabric portions 1031 and 1041 (FIG. 4). Each unidirectional fabric portion extends over a determined distance along the longitudinal direction $D_L$ at least from the bottom of the first and second non-interlinking sections 103a, 104a and over a determined distance along the transverse direction $D_T$ from the second transverse end 101d. In the example described here, the unidirectional fabric portions 1031 and 1041 extend on either side of the non-interlinking bottoms 103b, 104b (FIG. 4).

After weaving, as shown in FIGS. 7 and 8, a fiber preform 130 of the blade to be produced is formed from the blank 101. More precisely, the first part 102 is shaped to form a root preform part 137, a shank preform part 138 and an airfoil or aerodynamic profile preform part 139 comprising first and second transverse edges 139c and 139d intended to form, respectively, the leading and trailing edges of the blade to be produced. The aerodynamic profile preform part also comprises first and second faces 139e and 139f intended to form, respectively, a pressure face and a suction face of the blade to be produced. The parts 103 and 104 not bound to the parts 105 and 106, respectively, are cut to form segments 103d and 104d. Likewise, the parts 105 and 106 not bound to the part 102 are cut to form segments 105d and 106d. The segments 103d and 104d not bound to the parts 105 and 106, respectively, and the segments 105d and 106d not bound to the part 102 are unfolded or deployed. Unfolding is carried out at the non-interlinking bottoms. The segments 103d, 104d are first shaped to form lower preform parts 133a and 134a, while the segments 105d and 106d are first shaped to form upper preform parts 135a and 136a.

As illustrated in FIG. 9, the first and second unidirectional fabric portions 1051 and 1061 are first folded down along the longitudinal direction $D_L$ onto the first part 102 of the shaped blank to form the airfoil preform part 139.

As illustrated in FIGS. 10A and 10B, the shaping of the unfolded segments 105d, 106d is continued to form preform parts of an upstream wall 135d, 136d, preform parts of an upstream spoiler 135b, 136b, and preform parts of a downstream spoiler 135c and 136c. The formation of the upstream wall preform parts 135d, 136d and the upstream spoiler preform parts 135b, 136b comprises folding down, along the transverse direction $D_T$, a first part 1051a, 1061a, respectively, of the first and second unidirectional fabric portions 1051, 1061 onto a second part 1051b, 1061b, respectively, of the first and second unidirectional fabric portions 1051, 1061 held against the airfoil preform part 139 along the longitudinal direction $D_L$. The shaping of the upstream wall preform parts 135d, 136d and the upstream spoiler preform parts 135b, 136b is thus greatly facilitated by reducing the tensions and stresses on the texture of the fiber blank, particularly at the suitcase corner-type folds.

As illustrated in FIGS. 11A and 11B, the shaping of the unfolded segments 103d, 104d continues to form downstream wall preform parts 133d, 134d, and downstream spoiler preform parts 133c, 134c. The formation of the downstream wall preform parts 133d, 134d and the downstream spoiler preform parts 133c, 134c comprises folding along the transverse direction $D_T$ of a first part 1031b, 1041b, respectively, of the third and fourth unidirectional fabric portions 1031, 1041 onto a second part 1031a, 1041a respectively of the third and fourth unidirectional fabric portions 1031, 1041 held against the shank preform part 138 along the longitudinal direction $D_L$. The shaping of the downstream wall preform parts 133d, 134d and the downstream spoiler preform parts 133d, 134d is thus greatly facilitated by reducing the tensions and stresses on the texture of the fiber blank, particularly at the suitcase corner-type folds.

The fiber preform 130 is then densified. The densification of the fiber preform intended to form the fibrous reinforcement of the blade consists of filling the porosity of the preform, in all or part of its volume, with the material constituting the matrix. This densification can be carried out in a manner known per se according to the liquid process (CVL) or the gaseous process (CVI), or the ceramic filler injection process (slurry cast) or the silicon alloy impregnation process (MI or RMI) or even according to a sequence of one or more of these processes.

The liquid method consists of impregnating the preform with a liquid composition containing a precursor of the matrix material. The precursor is usually in the form of a polymer, such as a high performance epoxy resin, optionally diluted in a solvent. The preform is placed in a mold that can be tightly sealed with a housing in the shape of the final molded blade. The mold is then closed and the liquid matrix precursor (for example a resin) is injected into the entire housing to impregnate the entire fibrous part of the preform.

The transformation of the precursor into a matrix, i.e., its polymerization, is carried out by heat treatment, generally by heating the mold, after removing any solvent and cross-linking the polymer, the preform still being held in the mold having a shape corresponding to that of the part to be produced.

In the case of the formation of a carbon or ceramic matrix, the heat treatment consists of pyrolyzing the precursor to transform the matrix into a carbon or ceramic matrix depending on the precursor used and the pyrolysis conditions. By way of example, ceramic liquid precursors, especially SiC or SiCN, may be resins of the polycarbosilane (PCS) or polytitanocarbosilane (PTCS) or polysilazane (PSZ) type, whereas carbon liquid precursors may be resins with a relatively high coke content, such as phenolic resins. Several consecutive cycles, from impregnation to heat treatment, can be carried out in order to achieve the desired degree of densification.

Especially in the case of the formation of an organic matrix, the densification of the fiber preform can be carried out by the well-known resin transfer molding (RTM) method. In accordance with the RTM method, the fiber preform is placed in a mold having the outer shape of the part to be produced. A thermosetting resin is injected into the internal space of the mold which includes the fiber preform. A pressure gradient is generally established in this internal space between the place where the resin is injected and the evacuation orifices for the resin in order to control and optimize the impregnation of the preform by the resin.

Densification of the preform can also be carried out by polymer impregnation and pyrolysis (PIP), or by slurry cast impregnation, for example containing SiC and organic binders, followed by infiltration with liquid silicon (melt infiltration).

The fiber preform can also be densified, in a known manner, by a gaseous route by chemical vapor infiltration (CVI) of the matrix. The fiber preform corresponding to the fibrous reinforcement of the blade to be produced is placed in a furnace into which a reaction gaseous phase is admitted. The pressure and temperature prevailing in the furnace and the composition of the gaseous phase are chosen so as to allow diffusion of the gaseous phase within the pores of the preform in order to form the matrix therein by depositing, at the core of the material in contact with the fibers, a solid material resulting from decomposition of a constituent of the gaseous phase or from a reaction between several constituents, contrary to the pressure and temperature conditions inherent in chemical vapor deposition (CVD) methods that lead exclusively to deposition on the surface of the material.

The formation of an SiC matrix can be obtained with methyltrichlorosilane (MTS) giving SiC by decomposition of MTS, while a carbon matrix can be obtained with hydrocarbon gases such as methane and/or propane giving carbon by cracking.

A densification combining a liquid route and a gas route can also be used to facilitate implementation, limit manufacturing costs and cycles while obtaining satisfactory characteristics for the intended use.

The densification methods described above make it possible to produce, from the fiber structure of the invention, mainly parts made of composite material with an organic matrix (OMC), a carbon matrix (C/C) and a ceramic matrix (CMC).

In the case of the production of a part made of oxide/oxide composite material, the fiber structure is impregnated with a slurry filled with refractory oxide particles. After removal of the liquid phase from the slurry, the preform thus obtained is subjected to a heat treatment in order to sinter the particles and obtain a refractory oxide matrix. The structure can be impregnated with methods using a pressure gradient, such as injection molding methods known as "RTM" or submicron powder spraying known as "APS".

After densification, a blade 200 of composite material is obtained which, as illustrated in FIG. 12, comprises in its lower part a root 207 formed by the root preform part 137 of the fiber preform 130 which is extended by a shank 208 formed by the shank preform part 138 of the preform 130 and an airfoil or aerodynamic profile 209 formed by the airfoil preform part 139 of the preform 130. The airfoil 209 has a leading edge 209a and a trailing edge 209b corresponding, respectively, to the first and second transverse edges 139c and 139d of the fibrous preform 130, as well as a pressure face and a suction face 209e and 209f corresponding, respectively, to the first and second faces 139e and 139f of the preform 130. The blade 200 further comprises a lower platform 210 corresponding to the lower platform preform part 133a and 134a of the preform 130, an upper platform 220 corresponding to the upper preform part 135a and 136a of the preform 130, an upstream wall 230 corresponding to the upstream wall preform part 135d and 136d of the preform 130, a first upstream overlapping spoiler 240 corresponding to the upstream spoiler preform part 135*b* and 136*b* of the preform 130, a downstream wall 250 corresponding to the downstream wall preform part 133*d* and 134*d* of the preform 130, and a downstream overlapping spoiler preform 260 corresponding to the downstream spoiler preform part 135*c* 136*c* of the preform 130.

The invention claimed is:

1. A method for manufacturing a fiber preform of a turbomachine blade made of composite material, the method comprising:

forming by three-dimensional or multi-layer weaving between a plurality of layers of warp yarns and a plurality of layers of weft yarns of a fiber blank extending, along a longitudinal direction corresponding to the longitudinal direction of the blade to be produced, between first and second longitudinal ends, the fiber blank extending, along a transverse direction corresponding to the transverse direction of the blade to be produced, between first and second transverse ends intended to form, respectively, a leading edge and trailing edge of the blade, the fiber blank extending, along a thickness direction of the blank, between the first and second faces intended to form, respectively, a pressure face and a suction face of the blade, the fiber blank being separated along the thickness direction into first to fifth parts in first to fourth non-interlinking sections each extending along the longitudinal direction from a bottom of a non-interlinking section present at a determined distance from the first longitudinal end of the fiber blank, the first part being located between the second and fourth parts, on one side, and the third and fifth part, on the other side, the first part being bound by weaving to the second to fifth parts in an area extending between the first longitudinal end of the fiber blank and the bottoms of the non-interlinking sections, the fourth and fifth parts comprising on the side of the first transverse end of the fiber blank a portion in which the warp yarns are not woven with the weft yarns so as to define first and second unidirectional fabric portions, each unidirectional fabric portion extending over a predetermined distance along the longitudinal direction at least from the bottom of the third and fourth non-interlinking sections and a predetermined distance along the transverse direction from the first transverse end, the second and third parts comprising on the side of the first transverse end a portion in which the warp yarns are not woven with the weft yarns so as to define third and fourth unidirectional fabric portions, each unidirectional fabric portion extending over a predetermined distance along the longitudinal direction at least from the bottom of the first and second non-interlinking sections and a predetermined distance along the transverse direction from the first transverse end, forming, from the fiber blank, the preform of the blade to be produced, by unfolding on either side of the first part of the blank of segments of the second to fifth parts not bound to the first part and by shaping the unfolded segments of the second to fifth parts to form parts of preforms of platforms, walls and spoilers, the shaping of the segments of the second to fifth parts comprising folding down the first to fourth parts of unidirectional fabric onto the first part.

2. The method according to claim 1, wherein the shaping of the unfolded segments of the fourth and fifth parts comprises the formation of preform parts of a first platform of the platforms, preform parts of an upstream wall of the walls, and preform parts of an upstream spoiler of the spoilers, and in which the shaping of the unfolded segments of the second and third parts comprises the formation of preform parts of a second platform of the platforms, preform parts of a downstream wall of the walls, and preform parts of a downstream spoiler of the spoilers.

3. The method according to claim 2, wherein forming the preform parts of an upstream wall and the preform parts of an upstream spoiler comprises folding down, along the transverse direction, a first part of the first and second unidirectional fabric portions onto a second part of said first and second unidirectional fabric portions extending along the longitudinal direction.

4. The method according to claim 2, wherein forming the preform parts of a downstream wall and the preform parts of a downstream spoiler comprises folding down, along the transverse direction, a first part of the third and fourth unidirectional fabric portions onto the first part.

5. A method for manufacturing a turbomachine blade made of composite material, the method comprising:

manufacturing a turbomachine blade preform according to claim 1, densification of the preform by a matrix to obtain a blade made of composite material having first and second integrated platforms, an integrated upstream and downstream wall and an integrated upstream and downstream spoiler.

6. A blade fiber preform for a turbomachine having a three-dimensional or multilayer weave comprising in one piece first and second platform preform parts, upstream and downstream wall preform parts, upstream and downstream spoiler preform parts, a shrank preform part and an airfoil preform part, the preform further comprising first and second unidirectional fabric portions folded down onto the shank preform part, and third and fourth unidirectional fabric portions folded down onto the airfoil preform part.

7. The preform according to claim 6, wherein a part of the first and second unidirectional fabric portions is folded down along the transverse direction onto the airfoil preform part at the upstream wall preform parts and the upstream spoiler preform parts.

8. The preform according to claim 6, wherein a part of the third and fourth unidirectional fabric portions is folded down along the transverse direction onto a second part of said first and second unidirectional fabric portions extending along the longitudinal direction at the downstream wall preform parts and downstream spoiler preform parts.

9. The preform according to claim 6, further comprising a root preform part.

10. A turbomachine blade of composite material comprising first and second platforms, upstream and downstream walls, upstream and downstream spoilers and an airfoil part, the fibrous reinforcement comprising a blade fiber preform according to claim 6 densified by a matrix.

11. A turbomachine blade of composite material comprising a root, a shank, first and second platforms, upstream and downstream walls, upstream and downstream spoilers and an airfoil part, the fibrous reinforcement comprising a blade fiber preform according to claim 9 densified by a matrix.

12. An aircraft engine comprising a plurality of blades according to claim 10.

13. An aircraft comprising at least one engine according to claim 12.

* * * * *